No. 666,113. Patented Jan. 15, 1901.
H. SCHWICKART.
HEATER.
(Application filed Apr. 21, 1900.)
(No Model.)
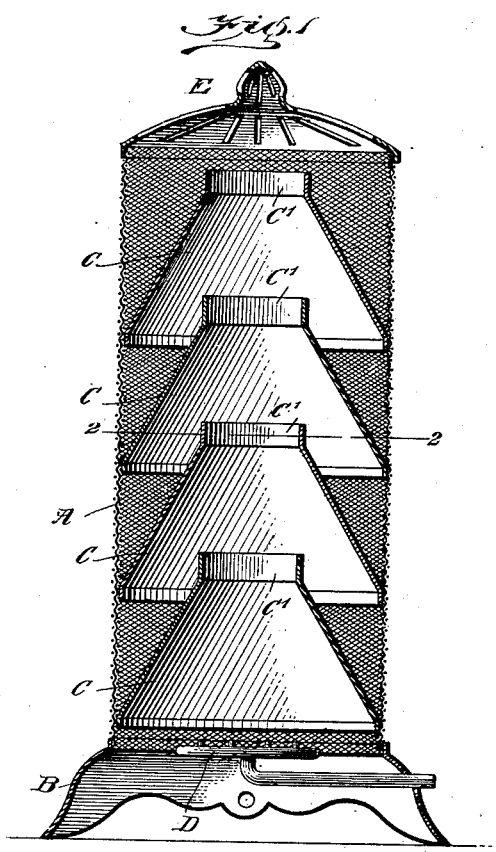
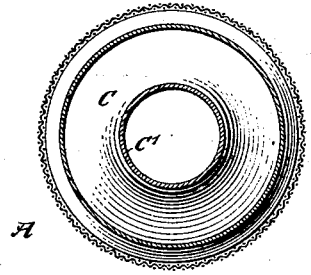
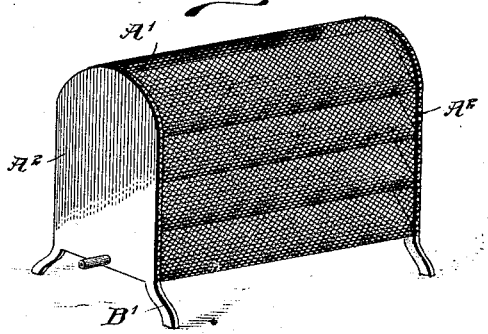
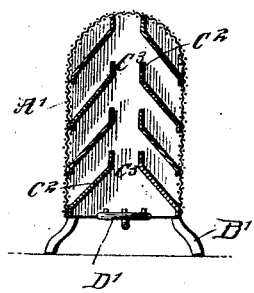
WITNESSES:
INVENTOR
Herman Schwickart.
BY 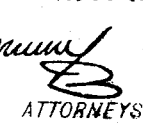
ATTORNEYS

UNITED STATES PATENT OFFICE.

HERMAN SCHWICKART, OF NEW YORK, N. Y.

HEATER.

SPECIFICATION forming part of Letters Patent No. 666,113, dated January 15, 1901.

Application filed April 21, 1900. Serial No. 13,728. (No model.)

*To all whom it may concern:*

Be it known that I, HERMAN SCHWICKART, a citizen of the United States, and a resident of the city of New York, borough of Brooklyn, in the county of Kings and State of New York, have invented a new and Improved Heater, of which the following is a full, clear, and exact description.

The object of the invention is to provide a new and improved heater for use in rooms, stores, and other places, and which is simple and durable in construction, very effective when in use, and arranged to heat a large amount of air with a comparatively small expenditure of fuel and to circulate the heated air in the room, and thereby insure a uniform heating of all parts thereof.

The invention consists of novel features and parts and combinations of the same, as will be fully described hereinafter and then pointd out in the claims.

A practical embodiment of the invention is represented in the accompanying drawings, forming a part of this specification, in which similar characters of reference indicate corresponding parts in all the views.

Figure 1 is a sectional side elevation of the improvement. Fig. 2 is a sectional plan view of the same on the line 2 2 in Fig. 1. Fig. 3 is a perspective view of a modified form of the improvement, and Fig. 4 is a transverse section of the same.

The improved heater illustrated in Figs. 1 and 2 consists, essentially, of a perforate shell A, preferably made cylindrical and having an open bottom and top, with the lower end mounted on suitable legs B, so as to raise the bottom of the shell a suitable distance off the floor. In the shell A are arranged a number of deflectors C, made approximately in the form of a truncated cone and preferably of sheet metal, the base ends being secured to the inside of the shell A and the apex end C' of one deflector extending into the base end of the next following deflector above as is plainly indicated in Fig. 1. The deflectors C are spaced a distance apart for the purpose mentioned and form a central draft-space in the shell and air-draft spaces between the sides of adjacent deflectors, the air-spaces extending upwardly and inwardly, the entrance to the space being in the perforate shell, as will be readily understood by reference to Fig. 1. In the bottom of the shell A and somewhat below the lowermost deflector C is arranged a suitable burner D, of any approved construction, and the top of the shell is preferably ornamented by a suitable open crown E.

When the heater is in action, the flame issuing from the burner D causes a heating of the surrounding air in the lowermost deflector, and this air is deflected upward through the central air-space. As the heated air rushes upward it creates a suction in the air-draft spaces between the sides of adjacent deflectors C, so that air from the room is drawn through the perforate shell into and up the said air-draft spaces to mix with the rising column of heated air originally induced by the flame of the burner D. As the shell A is perforate from the top to the bottom, it is evident that a large amount of air is drawn in through the shell and heated by the rising column of air, with which it mixes, to be finally discharged through the open top of the shell into the room, thus causing a rapid circulation of air in the room and a thorough and uniform heating thereof.

As illustrated in Figs. 3 and 4, the perforate shell A' is made inverted-U shape, the ends A² being formed with legs B', and on the sides of the shell A' are secured longitudinally-extending deflectors C², having upwardly-turned inner ends C³ for forming a central draft-space within the shell, as is plainly indicated in Fig. 4. The deflectors C² are inclined upward and inward, the end of a deflector being above the outer end of the next following deflector, above the same, as previously described in reference to the cone-shaped deflectors C. (Illustrated in Fig. 1.) The burner D' is located in the bottom of the shell A', and the operation is the same as above described in reference to Fig. 1—that is, the flame from the burner D' causes a heating of the air in the lowermost deflector C² and a rising of said air through the central air-space to cause a suction of air through the shell and through the space between adjacent deflectors. The air thus drawn in mixes with the already-heated air rising in the central air-space, and the heated air is finally discharged through the top of the shell into the room.

From the foregoing it is evident that a heating and free circulation of air is established, so that it is possible to heat a large quantity of air with a comparatively small expenditure of fuel and at the same time cause a proper circulation of air in the room in which the heater is located.

Having thus fully described my invention, I claim as new and desire to secure by Letters Patent—

1. A heater having a perforate shell, and spaced deflectors contained in the shell, one above the other, and formed to produce a central draft-space and inwardly and upwardly inclined air-passages between them, said air-passages beginning at the perforate shell and leading to the central draft-space at a point above the base end of the next deflector above, substantially as shown and described.

2. A heater, comprising a perforate cylindrical shell set on legs at the lower end and open at the top and bottom, a burner extending in the lower end of said shell, and a plurality of spaced deflectors in the form of truncated cones having their base ends secured to the inside of the shell, and forming a central draft-space and inwardly and upwardly inclined air-passages between them, said air-passages beginning at the perforate shell and leading to the central draft-space at a point above the base of the next deflector above, as set forth.

3. A heater, comprising a foraminated shell, and a plurality of deflectors arranged in the shell one above the other, and having their lower ends in contact with the inner surface of the shell, and their upper ends projecting into the deflector next above it, the said deflectors being formed to produce a central draft-space and inwardly and upwardly inclined air-passages between them, substantially as and for the purpose set forth.

4. A heater, comprising a foraminated cylindrical shell, and a series of deflectors in the form of truncated cones and arranged in the shell one above the other, with the apex end of one projecting into the base of the deflector next above it, the base of the deflectors being of a diameter equal to the internal diameter of the shell, the said deflectors forming a central draft-space and inwardly and upwardly inclined air-passages between them, substantially as described.

In testimony whereof I have signed my name to this specification in the presence of two subscribing witnesses.

HERMAN SCHWICKART.

Witnesses:
 JOHN MIDDLETON,
 ADOLPH VANREIN.